United States Patent [19]
Pickles

[11] 3,735,645
[45] May 29, 1973

[54] TRANSMISSION AND HOUSING
[75] Inventor: Joseph Pickles, Birmingham, Mich.
[73] Assignee: Ferro Manufacturing Corporation, Detroit, Mich.
[22] Filed: June 9, 1971
[21] Appl. No.: 151,179

[52] U.S. Cl..................................74/606, 74/425
[51] Int. Cl..............................................F16h 57/02
[58] Field of Search..................74/606, 425, 427, 74/608, 609; 308/15, 22, 238

[56] References Cited
UNITED STATES PATENTS 3,366,356 1/1968 Fisher..................................308/238
3,500,703 3/1970 Schertel et al.........................74/606
3,307,291 3/1967 Cremer..............................308/15 X
2,497,224 2/1950 Laure..............................308/DIG. 7

Primary Examiner—Milton Kaufman
Assistant Examiner—Frank H. McKenzie, Jr.
Attorney—Whittemore, Hulbert & Belknap

[57] ABSTRACT

Transmission for connecting a plurality of drive mechanisms to a corresponding plurality of input worms. The gearing is contained in a housing having a plastic cover provided with flexible recessed arms adapted to engage the shafts of the worms to constitute bearings, the arms being received in recesses in the housing to retain them in assembled relation.

10 Claims, 17 Drawing Figures

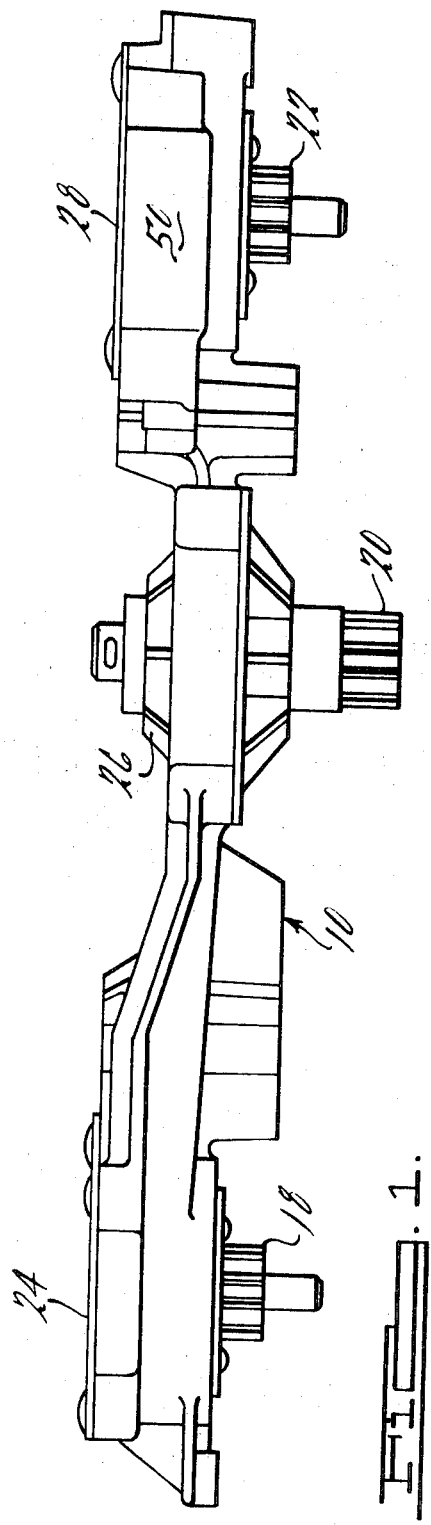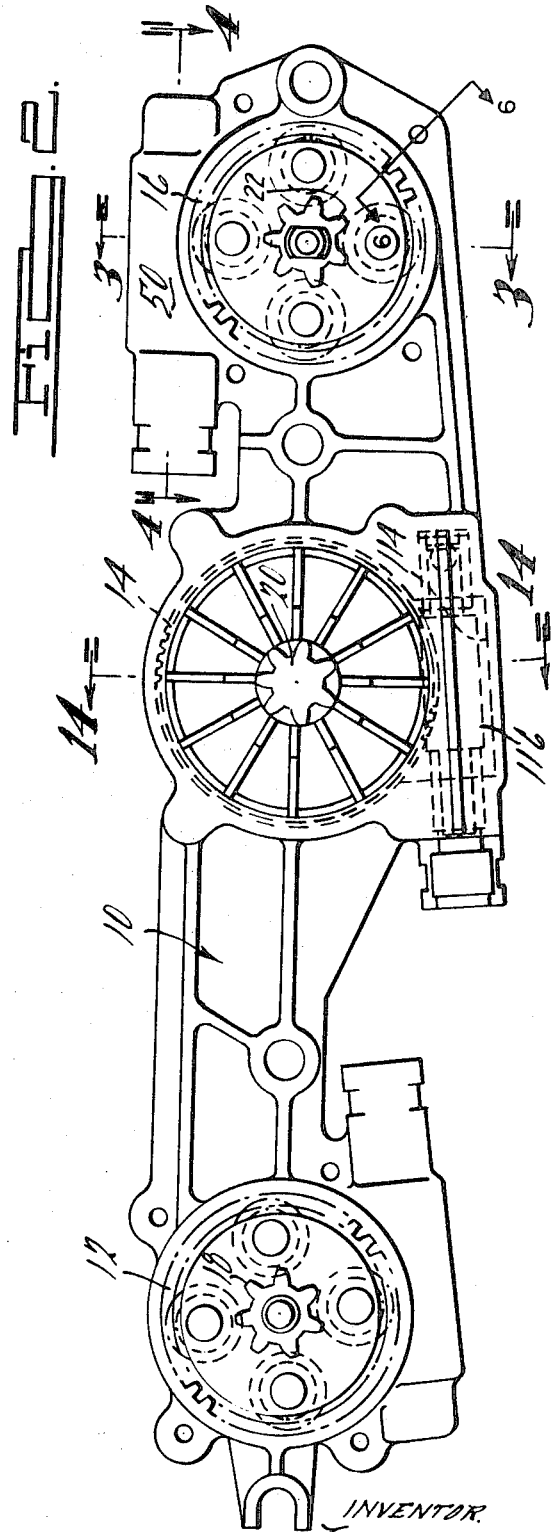

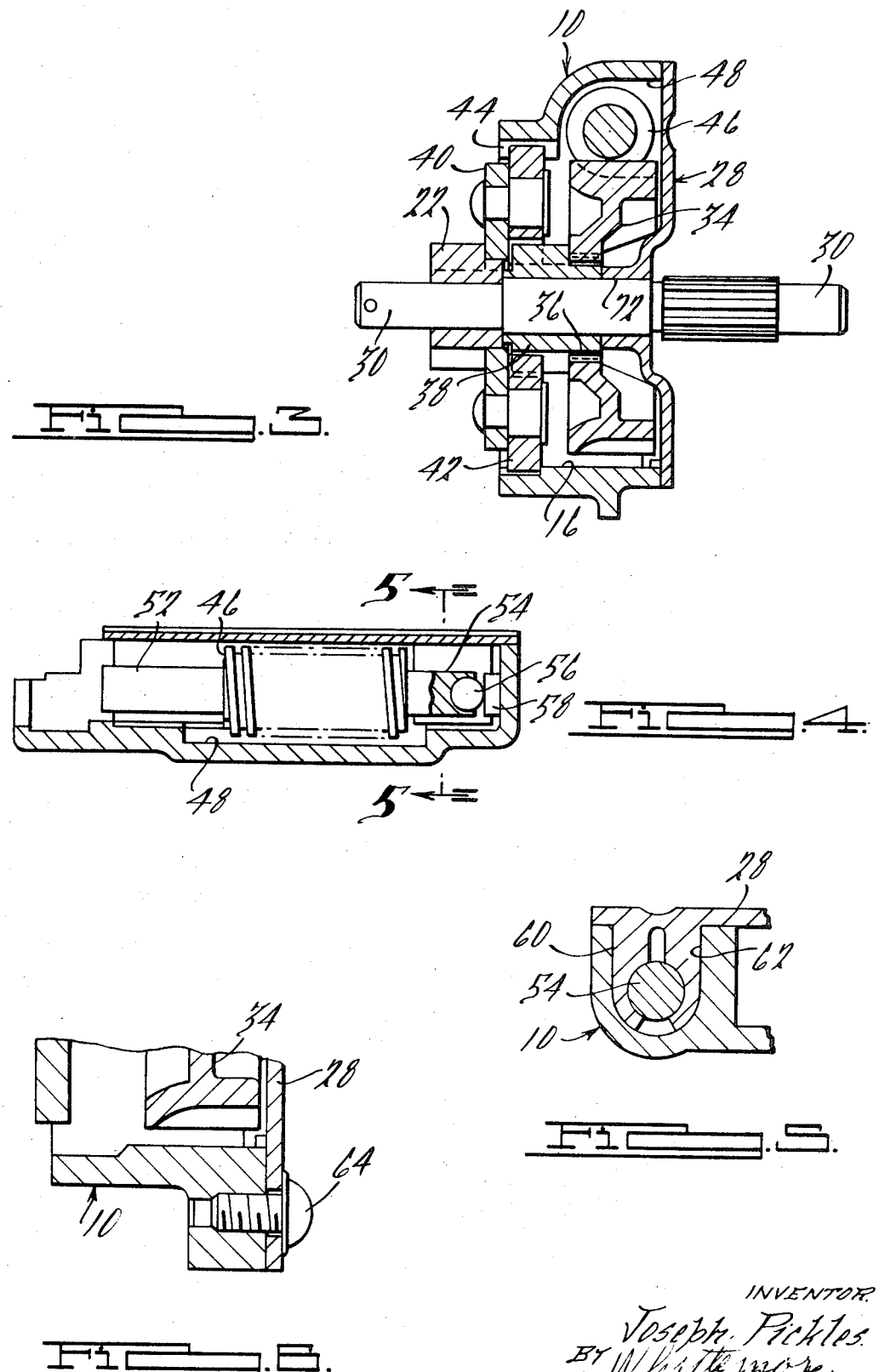

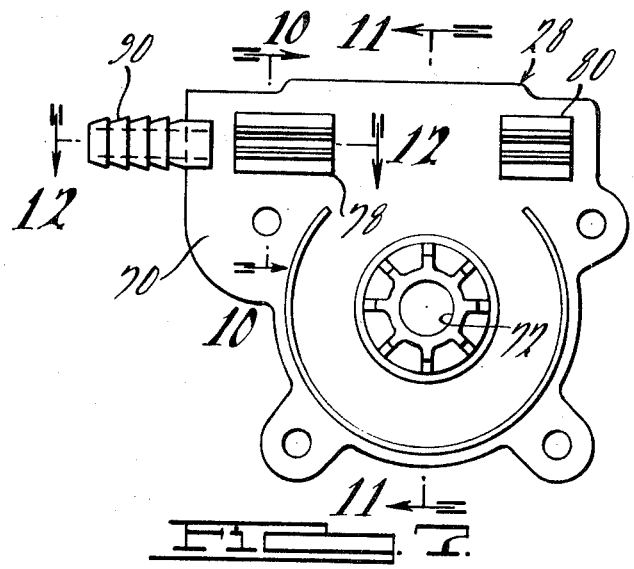
FIG. 7.
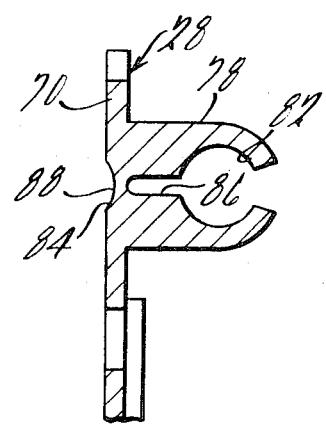
FIG. 10.
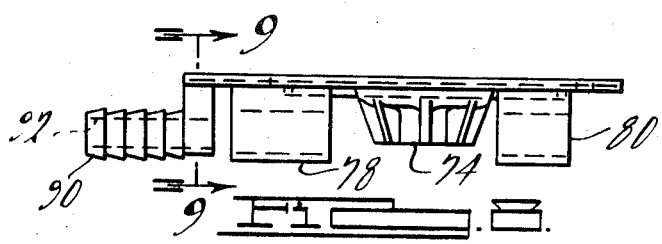
FIG. 8.
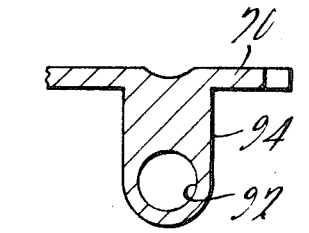
FIG. 9.
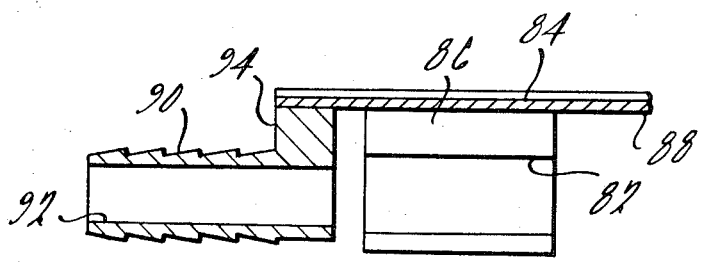
FIG. 12.
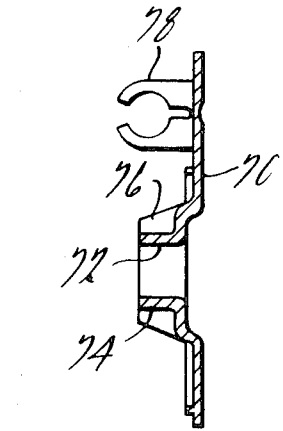
FIG. 11.
FIG. 13.
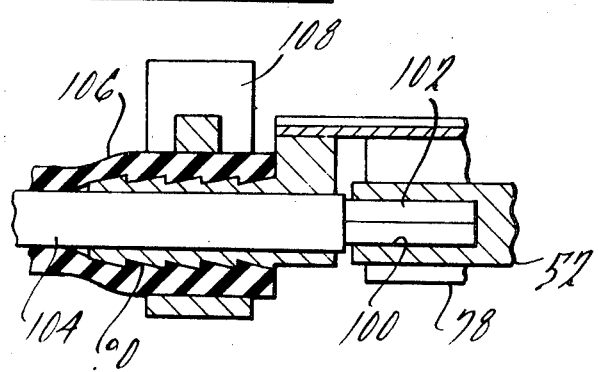

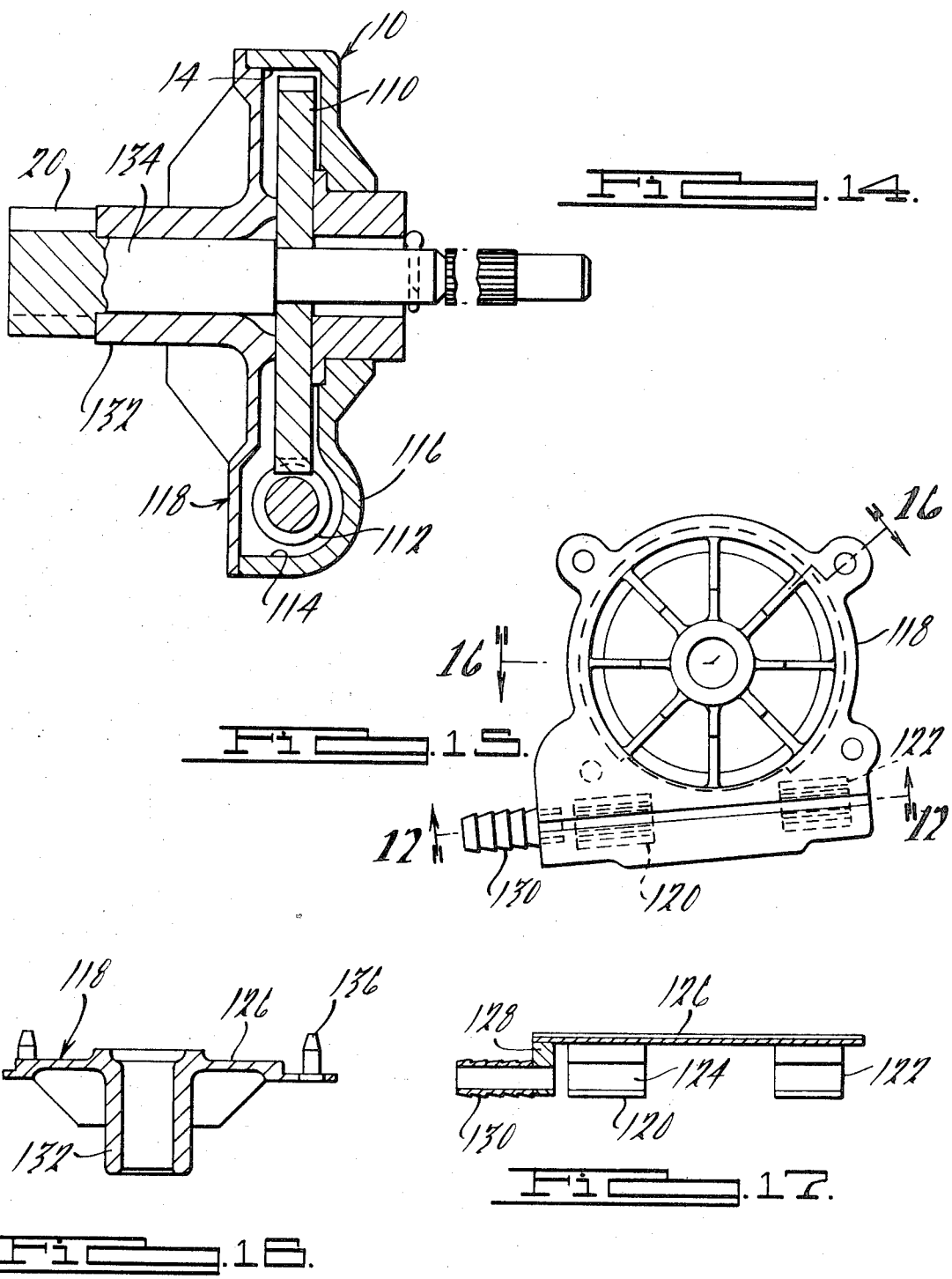

3,735,645

TRANSMISSION AND HOUSING

BRIEF SUMMARY OF THE INVENTION

The present transmission and housing therefor has been designed specifically for use in seat adjusting mechanism for a motor vehicle, but may find employment in other situations. However, as it relates to a seat adjusting mechanism, it includes three input and output elements, the input elements being in the form of worms adapted to be connected by flexible drive shafts with independently rotatable armatures of motor drive means.

Two of the output elements are in the form of gears or pinions cooperating in driving relation with conventional mechanism for selectively raising the front and rear edges of a vehicle seat, or both together, so that the seat may be raised, lowered, or tilted forwardly or rearwardly. The third output element takes the form of a pinion associated with a longitudinally extending rack so that rotation of the pinion effects fore and aft movement of the seat.

An important feature of the invention is that the housing for the gearing includes separate detachable covers preferably formed of a suitable plastic material such for example as a suitable low friction acetyl resin, which is sold under the name Delrin. This material has a low coefficient of friction, and in conjunction with an initial treatment of a suitable dry lubricant, constitutes bearing means for a rotatable input gear or worm which requires no lubrication.

In order to facilitate assembly of the construction, the cover includes pairs of spaced arms each pair of which is provided with confronting arcuate recesses adapted to permit shaft portions of an input gear or worm to be pressed into position to be journaled in the arcuate recesses. The main housing, preferably in the form of a casting, has recesses into which the pairs of arms project and are firmly held against separation. With this construction separate bearings are not required.

BRIEF DESCRIPTION OF THE DRAWINGS

FIG. 1 is a side elevation of the assembled housing.
FIG. 2 is a plan view of the structure shown in FIG. 1.
FIG. 3 is a section on the line 3—3, FIG. 2.
FIG. 4 is a section on the line 4—4, FIG. 2.
FIG. 5 is a section on the line 5—5, FIG. 4.
FIG. 6 is a section on the line 6—6, FIG. 2.
FIG. 7 is a plan view of the plastic housing cover.
FIG. 8 is an edge view of the cover seen in FIG. 7.
FIG. 9 is an enlarged section on the line 9—9, FIG. 8.
FIG. 10 is an enlarged section on the line 10—10, FIG. 7.
FIG. 11 is a section on the line 11—11, FIG. 7.
FIG. 12 is an enlarged section on the line 12—12, FIG. 7.
FIG. 13 is an enlarged sectional view similar to FIG. 12 showing the assembly with an input gear and drive cable.
FIG. 14 is a section on the line 14—14, FIG. 2.
FIG. 15 is a plan view of the cover seen in FIG. 14.
FIG. 16 is a section on the line 16—16, FIG. 15.
FIG. 17 is a section on the line 17—17, FIG. 15.

DETAILED DESCRIPTION

Referring first to FIGS. 1 and 2 there is shown a transmission comprising a housing 10 which is preferably a casting of light metal including three principal cavities designated 12, 14 and 16. As will subsequently be described, gearing is mounted in the cavities and is connected to output pinions 18, 20 and 22. The pinions 18 and 22 are respectively connected to conventional lift devices associated with the seat frame of a motor vehicle and when the pinions are rotated, are effective to raise or lower the associated front or rear edge of the seat. Details of the seat lifting mechanism form no part of the present invention.

The intermediate pinion 20 is in mesh with a substantially horizontal rack extending from front to rear of the vehicle, and when rotated, effects movement of the seat in a fore and aft direction.

As is well understood, in the case of bench type seats in particular, the lift mechanisms and the fore and aft drive mechanisms are normally provided in pairs at opposite ends of the seat and rotatable transmission elements are interconnected to torsion bars to assure uniform movement of opposite ends of the seat.

The cavities within the casting which constitutes the main housing 10 are closed by separately removable covers designated 24, 26 and 28. As will subsequently be described in detail, each of these covers includes means constituting supports and integral bearings or journal devices for receiving input gears, specifically in the present instance, input worms. The covers are formed of suitable plastic material having low friction characteristics so that when a rotatable shaft is received in recesses provided in the portions of the covers, the construction constitutes supports and bearing structure obviating the necessity for independent separate bearings.

The housing cavities 12 and 16 at opposite ends of the housing 10 are substantially identical although essentially reversed in orientation, and hence, only the construction at the area 16 will be described in detail.

Referring now to FIGS. 3–6, the cavity 16 of the housing 10 is closed by the cover 28, the housing and cover together providing a support for a rotatable shaft 30 having an external pinion adapted to drive associated seat lifter mechanism. Rotatable on the shaft 30 within the cavity is a worm gear 34 connected in driving relation by suitable means such as a key 36 to a rotatable sun gear 38. A carrier plate 40 connected in driving relation to the output pinion 22, carries a plurality of planet gears 42 each of which is in meshing relation with the sun gear 38 and also in meshing relation with an internal gear 44 the teeth of which are formed in the portion of the casting or housing 10. With this arrangement, rotation of the worm gear 34 by means subsequently to be described, transmits rotation to the sun gear 38 which causes the planet pinions 42 to rotate and revolve with the carrier 40, thus effecting rotation of the output pinion 22.

Referring now primarily to FIGS. 2, 4, 5 and 6, the input worm gear 34 is driven in rotation by an elongated input worm 46 which is received in an elongated cavity portion 48 formed in the casting and communicating with the cavity 16. The generally convexly curved elongated exterior wall of the cavity 48 is indicated at 50. The worm 46 has end shaft portions 52 and 54, the end portion 54 having a recess receiving a thrust ball 56 which engages a wear plate 58 as best seen in FIG. 4. The detailed construction of the means supporting the worm 46 will be subsequently described but for the time being it is sufficient to note that the shaft portions are supported in confronting recesses provided in flexible arms 60 projecting from the cover 28, the arms being received in recesses 62 provided in the housing 10 in the relationship best illustrated in FIG. 5.

In FIG. 6 the cover 28 is illustrated as firmly affixed to the casting constituting the housing 10 by suitable means such as screws 64.

Referring now to FIGS. 7-13, the cover 28 is shown in detail. As previously indicated, this cover is formed of a suitable low friction resin such for example as an acetyl resin sold by DuPont under the trade name Delrin.

The cover 28 is essentially of a flat plate-like structure 70 having a central opening 72 surrounded by a tubular flange construction 74 preferably reinforced by fins 76, all as best seen in FIG. 11. The opening 72 receives the intermediate cylindrical portion of the shaft 30, as best seen in FIG. 3. At one side of the plate-like portion 70 of the cover there are provided two pairs of arms 78 and 80 separated as best illustrated in FIGS. 7 and 8. As seen in the enlarged sectional view of FIG. 10, the arms 78 or 80 of each pair are provided with cylindrically formed recesses 82, which when properly spaced provide a nearly complete cylindrical bearing surface for engaging one of the shaft portions 52,54 of the worm 48.

In order to permit insertion of the end shaft portions 52,54 of the worm, the arm 78 or 80 or each pair may be moved apart and the shaft pressed into place, after which the arms snap back to their original shaft engaging and supporting position. In order to increase the flexibility which permits the arms 78 or 80 to be separated, the plate portion 70 of the cover 28 is provided with a shallow groove 84 and the arms 78 or 80 are separated by a relatively deep groove 86 leaving only a thin web 88 which is readily bent to provide for assembly of the worm with the cover.

In alignment with the generally cylindrically formed bearing portions of the arms 78 and 80 there is provided a tubular barbed construction 90 having a central opening 92 supported by a short supporting arm 94, as best seen in FIGS. 9 and 12.

Referring now to FIG. 13 there is illustrated the manner in which the worm 46 is mounted in the arms of the cover and connected to an input driving mechanism. As seen in this Figure, the end portion of the shaft 52 of the worm is provided with a recess 100 of non-circular cross-section which is adapted to receive a correspondingly non-circular driving end 102 of a flexible drive shaft 104. The shaft portion 52 is embraced by the recesses formed in the arms 78 which support the worm for free rotation in accurately located position in which it is in mesh with the worm gear 34 previously described. The flexible drive shaft 104 is provided with a sheath 106 which at its end is separated from the drive shaft 104 and is forced over the tubular barbed portion 90 of the cover, the barbs retaining the sheath 106 against removal and accordingly, retaining the non-circular end 102 of the drive shaft in driving relation in the recess 100 of the worm shaft 52. Preferably, the assembly is completed by suitable clamp means such for example as a hose clamp diagrammatically illustrated at 108, which embraces the portion of the sheath 106 sleeved over the barbed tubular portion 90 and clamps it in assembled relationship therewith.

The gearing associated with the horizontal adjusting pinion is essentially similar to the gearing associated with the vertical pinions 18 and 22, but for completeness will be described separately.

Reference is now made to FIGS. 14-17. As best seen in FIG. 14, the housing 10 is provided with the cavity 14 which receives a worm gear 110 which is in mesh with an input worm 112 received in the elongated cavity portion 114 of the housing, the exterior surface of which is indicated at 116 in FIG. 2. Again, the cover 118 is formed of the plastic material having a low coefficient of friction and provided with two pairs of spaced apart arms 120, 122 each of which is provided with confronting recesses 124 adapted to engage and support the ends of the worm shaft in the same manner as the recessed arms 78 previously described.

The cover includes the flat plate portion 126 from which the arms 120 and 122 project and also includes an arm 128 supporting a barbed tubular portion 130 adapted to receive the end of the sheath of a flexible drive cable in the same manner as illustrated in FIG. 13.

In this case the cover 118 includes an elongated tubular portion 132 adapted to support an intermediate portion of a shaft 134 keyed to the worm gear 100 and carrying output pinion 20. The plate portion 126 of the cover 118 includes integrally formed projections 136 which are adapted to be pressed into appropriately shaped recesses formed in the casting around the periphery of the cavity 14.

The present construction is characterized by the simplicity and economy with which a housing is provided with internal gearing, which may be of the planetary type or of the simple worm and worm gear type, while eliminating the necessity for machining of the casting which forms the main portion of the housing, or the provision of separate bearing elements, by the expedient of providing recessed arms on the flexible plastic cover which may be forced apart to receive end shaft portions of the input worm. Accordingly, the worm may be pre-assembled with the cover. The worm gear and the gearing, if any, associated therewith, may be pre-assembled in the housing, and the cover applied so as to provide further support for the gearing in the housing. The housing casting includes recesses into which the pairs of arms on the cover are inserted so that with the cover in place, the shaft portions of the input worm are supported in the recessed portions of the arms and inadvertent release thereof is effectively prevented.

What I claim as my invention is:

1. A transmission comprising a two-part housing structure for enclosing gearing including at least one transmission gear therein, one housing part comprising a wall having a pair of generally parallel spaced apart arms projecting laterally from one side of said wall, the free ends of said arms being movable toward and away from each other, said arms having adjacent their free ends confronting recesses defining shaft support and bearing means when said arms are in the position of closest approach, a second gear having a shaft portion received in said recesses, said other housing part having surfaces therein engaging said arms when said housing parts are assembled to retain said arms in the closest approach position while said parts remain in assembly.

2. A transmission as defined in claim 1 in which said one housing part is a unitary structure formed of a resin having a low coefficient of friction so that the recessed arms constitute a low friction bearing support for said input gear.

3. A transmission as defined in claim 2 in which said wall is flexible and the portion of said wall intermediate said arms is flexed upon separation of the recessed portions of said arms.

4. A transmission as defined in claim 3 in which said one housing part is firmly affixed to said other housing part in assembly.

5. A transmission as defined in claim 3 in which said second gear is a worm having oppositely extending shaft portions, and said one housing part has two spaced pairs of arms, the arms of each pair cooperating to engage and rotatably support one of said shaft portions.

6. A transmission as defined in claim 5, said one housing part having an outwardly barbed tubular extension in alignment with said worm for receiving a flexible drive shaft extending through said extension and engageable with said worm, and for receiving the end of a sheath of the drive shaft on its barbed outer surface.

7. A transmission as defined in claim 5 in which a worm gear is received in said other housing part, and means in said other housing part supporting said worm gear for rotation in mesh with said worm.

8. A transmission as defined in claim 7 comprising a worm gear support shaft in said housing on which said worm gear is mounted, said one housing part having an opening receiving and locating a portion of said worm gear support shaft to locate the worm gear thereon in proper meshed relation with the worm carried by the arms on said one housing part.

9. A transmission as defined in claim 3, said flexible wall having a channel at the side opposite said arms and in registration with the space between said arms to provide a local reduction in thickness to increase flexibility of said wall to provide for ready separation between the recessed free end portions thereof.

10. A transmission as defined in claim 9 in which said channel is straight and is in registration with the spaces between the arms of both pairs of arms.

* * * * *